United States Patent [19]

Ise et al.

[11] Patent Number: 5,271,983
[45] Date of Patent: Dec. 21, 1993

[54] STRUCTURE OF LIGHT-SHIELDING CLOTH AND FILM CONTAINER USING THE SAME

[75] Inventors: Jun Ise; Kazunori Mizuno; Kazuyoshi Suehara, all of Kanagawa; Tokihide Suzuki; Masazumi Tomoda, both of Fukui; Koichi Takahashi, Kanagawa, all of Japan

[73] Assignee: Fuji Photo Film Co., Ltd., Minami-ashigara, Japan

[21] Appl. No.: 686,998

[22] Filed: Apr. 18, 1991

[30] Foreign Application Priority Data

| Apr. 19, 1990 | [JP] | Japan | 2-41989[U] |
| Apr. 19, 1990 | [JP] | Japan | 2-41990[U] |
| Jul. 2, 1990 | [JP] | Japan | 2-69592[U] |
| Jul. 2, 1990 | [JP] | Japan | 2-69593[U] |
| Jul. 2, 1990 | [JP] | Japan | 2-69594[U] |

[51] Int. Cl.$^5$ ............ B32B 3/02; D05C 17/00; G03B 17/26; B65D 85/66
[52] U.S. Cl. ............ 428/92; 428/85; 428/95; 428/97; 428/253; 354/277; 206/389; 206/397; 206/409; 66/194
[58] Field of Search ............ 428/85, 95, 97, 92, 428/253; 354/277; 206/389, 397, 409; 66/194

[56] References Cited

U.S. PATENT DOCUMENTS

| 2,114,638 | 4/1938 | Parker | 354/277 |
| 2,484,225 | 10/1949 | Herzig | 354/277 X |
| 2,737,702 | 3/1956 | Schmidt et al. | 428/97 X |
| 2,804,762 | 9/1957 | Kameda | 66/194 |
| 3,732,708 | 5/1973 | Troy | 66/194 |
| 4,010,004 | 3/1977 | Brown et al. | 428/97 X |
| 4,338,800 | 7/1982 | Matsuda | 66/194 |
| 4,568,590 | 2/1986 | Iwai | 428/93 X |
| 4,579,763 | 4/1986 | Mitman | 428/97 X |
| 4,589,267 | 5/1986 | Barbee | 66/194 |
| 4,672,825 | 6/1987 | Yasukawa et al. | 66/194 |
| 4,730,778 | 3/1988 | Akao et al. | 206/389 X |
| 4,913,368 | 4/1990 | Atkinson | 354/277 X |
| 5,016,450 | 5/1991 | Pernick | 66/194 |

FOREIGN PATENT DOCUMENTS

| 0440240 | 8/1991 | European Pat. Off. | 354/277 |
| 0440241 | 8/1991 | European Pat. Off. | 354/277 |
| 62-286042 | 12/1987 | Japan. | |

*Primary Examiner*—George F. Lesmes
*Assistant Examiner*—Terrel Morris
*Attorney, Agent, or Firm*—Burns, Doane, Swecker & Mathis

[57] ABSTRACT

Light shielding cloths excellent in light-shielding ability, and film drawing resistance are obtained by increasing the pile yarn density in accordance with a special formula, by passing pile yarns between the needle loop and the sinker loop of the ground fabric or by using a combination of regular yarn and special yarn. The contamination of the film by the thermobleeding of the dye is prevented by using a particular dye. The generation of static marks is also prevented by treating the light-shielding cloth comprising synthetic fiber with a special antistatic agent or treatment.

11 Claims, 5 Drawing Sheets

STRUCTURE OF LIGHT-SHIELDING CLOTH AND FILM CONTAINER USING THE SAME

BACKGROUND OF THE INVENTION

This invention relates to a structure of a light-shielding cloth and a film container, particularly a photographic film container, using the same.

As the containers for a photographic film container, although there are cassettes for sheet films, cartridges for a roll film and the like, all of the containers are provided with a light-shielding member at the slit for extending the film in order to prevent the photographic film from being exposed to light entering there through. When the light-shielding member is a cloth, it is called light-shielding cloth. In typical containers for a light-sensitive strip film, as shown in FIG. 8, a wound light-sensitive strip film, such as photographic film 11, is put in the film container body 13 in a rotatable state, and the slit 14 for extending the light-sensitive film 11 is formed. Light-shielding members for shielding light, such as the light-shielding cloth 15:15 are attached to both of the upper and lower tongue portions 16,16 of the slit 14. The light-shielding cloth is usually colored black in order to ensure the light-shielding ability, and moreover, it is necessary to be soft so as not to damage the photographic film at the time of extending and rewinding it.

The film container disclosed in Japanese Utility model KOKOKU No. 46-20539 is provided with a light-shielding cloth composed of a ground fabric and coreless pile yarn woven thereinto at the slit. The coreless pile yarn is formed from a soft raw yarn having polar groups, such as viscose yarn, acetate yarn or nylon yarn, by crimp processing, and the reverse side of the ground fabric is impregnated with an adhesive in order to fix the pile yarn. Another film container is disclosed in Japanese Patent KOKAI No. 54-36925 wherein the light-shielding cloth is formed by electrostatic flocking.

However, in the case of conventional light-shielding cloth, fraying or falling out of pile yarn occurs during the manufacture of the light-shielding cloth and during extending or rewinding the light-sensitive strip film. Dust from the pile yarn adheres to the surface of the light-sensitive material, and causes trouble in exposure and development. It is also a problem that its manufacture process is complicated and manufacturing cost is expensive. In the case of the light-shielding cloth formed by electrostatic flocking, the workability in the production is inferior due to the use of adhesive, and moreover, the flocked yarn will be easily fall out.

The applicants improved and reported a light-shielding cloth having less troubles, such as fray and falling out, capable of being produced in a relatively simple process and at a low cost (Japanese Utility Model KOKOKU No. 61-34526). The light-shielding cloth has a knitted structure shown in FIGS. 11 and 12, and is formed of a ground fabric 21 having a warp knitted structure formed of filament yarn 23 composed of chain yarn 25 and inlay yarn 26 and a pile portion 22 wherein pile yarn 24 is disposed in parallel to the chain yarn 24, looped and set up. A cross section in the direction perpendicular to the section of FIG. 12 is shown in FIG. 14. The light-shielding cloth is used, for example, in the form shown in FIG. 13, wherein a filler layer 27 and an adhesive layer 28 are provided successively under the ground fabric 21.

A light-shielding cloth structure disclosed in Japanese Patent KOKAI No. 60-208751 uses a conjugate yarn (special yarn) spun of two kind polymers. In another light-shielding cloth disclosed in Japanese Patent KOKAI No. 62-98347, the pile is formed using a high bulky yarn (special yarn).

In general, the light-shielding cloths are dyed using a direct dye, an acid dye, a metal complex dye or the like, and the dye is strongly bound to the fiber of the light-shielding cloth through ionic bonding. Recently, polyester fibers improved in various fiber properties were used for improving the material cost, the light-shielding ability, the film drawing resistance and the like. The light-shielding cloth formed of the polyester fiber is dyed with a disperse dye.

As a recent trend of cameras, they are provided with a high speed winding and rewinding mechanism, and cameras having a winding speed of more than 10 frames per second have been sold. Accompanied with the increased use of the high speed winding camera, a static mark problem occurred due to the generation of static electricity by the friction between the light-shielding cloth attached to the slit of the film container and the photographic film during the operation of the camera. The static electricity was discharged to form exposed spots, and they appeared as the contaminated part, i.e. static marks, by the development. Besides, recent photographic films have a high sensitivity and a high quality, and they are liable to form static marks more than conventional films. As the means to prevent the generation of the static mark, various means have been developed and are disclosed in Japanese Patent KOKAI Nos. 55-129173, 46-28218, 62-286041 and 62-286042.

In the case of the knitted light-shielding cloth disclosed in Japanese Utility KOKOKU Model No. 61-34526, the light-shielding ability was unstable. Moreover, the drawing resistance of the film was relatively great, and the film surface, particularly the photographic emulsion surface, was occasionally damaged. Therefore, when the pile density was increased in order to improve the light-shielding ability, the abrasion troubles increased, and the photographic film could not be delivered in the camera, in the extreme case.

In the case of the light-shielding cloth using the conjugate yarn, the filament was thick, and its bounce impact elasticity was strong. Therefore, the drawing resistance was great. Furthermore, since the conjugate yarn was formed by spinning two kind polymers, it was expensive.

The light-shielding cloth using the high bulky yarn has a problem that, when it was strongly pressed during processing or continuously compressed at the exit, the plush was decreased to degrade the light-shielding ability. Moreover, the light-shielding cloth was expensive due to the price of the yarn.

In the case of the light-shielding cloth formed of the polyester fiber, the dyeing mechanism is different from other conventional light-shielding cloths, and depends on physical bonding, mainly Van der Waals bonds. Therefore, the phenomenon occurred that the bond of the dye is easily released by thermal energy and the like so that it is suspended on the surface of the fiber, called the thermobleeding phenomenon. The thermobleeding phenomenon correlates to the molecular weight of the dye molecule, and a dye molecule having a greater molecular weight induces a greater thermobleeding.

Incidentally, disperse dyes are roughly divided into quinone dyes and azo dyes in view of the molecular structure. The quinone dyes are mainly used for light to medium colors because of having relatively a small molecular weight, a small absorption coefficient, a weak fastness of color and a great level dyeing ability, and the azo dyes are mainly used for high concentration dyeing because of having relatively a large molecular weight, a great absorption coefficient, a strong fastness of color and a small level dyeing ability. Thus, the azo dyes were mainly used as the disperse dye for dyeing light-shielding cloths which were colored black, and the thermobleeding occurred greatly due to the large molecular weight of the azo dye molecule. The released dye molecule due to the thermobleeding phenomenon transferred to contaminate the acetate film which was the base film of photographic films under particular environmental conditions, and affected adversely the photographic properties remarkably. For example, when a photographic film cartridge was put in a car while loaded in a camera or packaged in a film case, the photographic film was exposed to a high temperature, and the water content dissolved in the gelatin of the photographic emulsion layer was evaporated and then condensed. The released dye on the surface of the fiber of the light-shielding cloth was transferred to contaminate the photographic film through the condensed water. As mentioned above, in the case of the conventional light-shielding cloth using the black disperse dye, the contamination of the photographic film surface is unavoidable under the particular conditions. In order to solve the above problems, various investigations have been made, but satisfactory results have not been obtained.

As mentioned previously, although various means to prevent the generation of static marks have been developed particularly for the cameras provided with a high speed winding and rewinding mechanism, they were practically unsatisfactory because of losing the softness of the fiber, having a short durability of the antistatic effect or affecting adversely the light-sensitive face of the photographic film. Particularly, in the case of the light-shielding cloth formed of polyester fiber, the treatment with an antistatic agent which is a usual surfactant disclosed in Japanese Patent KOKAI Nos. 62-286041 and 62-286042 was inferior in the durability of the antistatic effect. Moreover, the surfactant was temporarily adhered due to the properties of polyester fiber, and therefore, the surfactant was eluted from the surface of the fiber under an environment where water is present. The eluted surfactant reacted with the photographic emulsion on the film surface, and affected adversely the photographic properties. As the environment where water is present, for example, the photographic film cartridge put in a car mentioned previously corresponds thereto.

SUMMARY OF THE INVENTION

An object of the invention is to provide a light-shielding cloth having no problem of falling out of pile yarn and capable of increasing the pile density to ensure the light-shielding ability.

Another object of the invention is to provide a light-shielding cloth having a small drawing resistance of a photographic film and capable of drawing photographic film out of a container without forming an abrasion.

Another object of the invention is to provide a light-shielding cloth having a small bounce impact elasticity and nevertheless capable of ensuring a sufficient light-shielding ability.

Another object of the invention is to provide a light-shielding cloth which is excellent in light-shielding ability and drawing resistance of photographic film and which does not contaminate the photographic film by the dye used for the cloth.

Another object of the invention is to provide a light-shielding cloth having a long durability of antistatic effect and not affecting adversely photographic properties.

Another object of the invention is to provide a film container using the above light-shielding cloth.

The light-shielding cloth and film container of the invention have achieved the above object.

In one aspect, the present invention provides a light-shielding cloth having a ground fabric and a pile portion knitted thereinto and satisfying the following formula:

$$\frac{A}{(1-a)} * \frac{B}{(1-b)} * n * f > 129{,}000 \text{ piles/inch}^2$$

\* is used as a multiplication mark.
$A$: The number of stitches in the longitudinal direction immediately after knitting (yarns/inch)
$B$: The number of stitches in the lateral direction immediately after knitting (yarns/inch)
$a$: Shrinkage fraction in the longitudinal direction of the ground fabric
$b$: Shrinkage fraction in the lateral direction of the ground fabric
$a$ or $b = (x - y)/x$
$x$: The length before shrinking in the longitudinal or lateral direction (the length immediately after knitting)
$y$: The length after shrinking in the longitudinal or lateral direction
$n$: The number of pile yarns per root (yarns/root)
$f$: The number of filaments composing the pile yarn (filaments/pile yarn).

In another aspect, the present invention provides a light-shielding cloth having a ground fabric and a pile portion formed of pile yarns knitted thereinto comprising setting up said pile yarn which passes between the needle loop and the sinker loop composing the ground fabric, In an additional aspect, the present invention provides a light-shielding cloth having a ground fabric and a pile portion knitted thereinto which comprises forming said pile portion by a combination of regular yarn and special yarn and setting up these yarns entangled with each other, In a further aspect, the present invention provides a light-shielding cloth which comprises polyester yarn and is dyed black with a blended dye containing a disperse dye as the principal component of which the thermobleeding rate of the blue component is less than 2.0%, In a still further aspect, the present invention provides a light-shielding cloth which comprises synthetic fiber which is treated at least with an antistatic agent or an antistatic treatment having a resistance to washing with warm water.

In a yet further aspect, the present invention provides a film container which is provided with anyone of the above light-shielding cloth as the light-shielding member on the slit for extending a photographic film.

Figure 1:
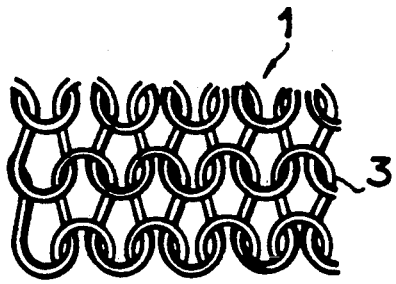
FIG. 1 is a partial rear view of a light-shielding cloth embodying the invention.

1 ... Ground fabric
2 ... Pile portion
3 ... Filament yarn for the ground fabric
4 ... Pile yarn
5 ... Chain yarn
6 ... Insert yarn
7 ... Filler layer
8 ... Adhesive layer
9 ... Regular yarn
10 ... Special yarn
11 ... Photographic film
12 ... Spool
13 ... Container body
14 ... Slit
15 ... Teremp cloth
16 ... Tongue portion

DETAILED DESCRIPTION OF THE INVENTION

The relation between the pile density and the light-shielding ability at the slit of a film cartridge was investigated. First, several kinds of light-shielding cloth different in the pile density were prepared by using a raschel machine, and had the structure where two pile yarns were engaged per root. Each light-shielding cloth was adhered to the slit having a slit width in the transverse direction of 2.1 mm of a JIS 135 type photographic film cartridge as the light-shielding member. A roll of ISO 100 color photographic negative film (manufactured by Fuji Photo Film Co., Ltd.) was loaded in each cartridge, and the cartridges were exposed to the light of 70,000 luxes for 3 minutes to the slit side and both ends. Then, each film was developed, and fogged degree was observed. The results are shown as follows:

| Pile Density ($\times 10^3$ yarns/cm$^2$) | | | | | | | |
|---|---|---|---|---|---|---|---|
| 10 | 12 | 14 | 16 | 18 | 20 | 22 | 24 |
| Fogged Portion B | B | B | B | B | A | A | A |

A: Fogged portion is shorter than 10 cm from the slit.
B: Fogged portion is not shorter than 10 cm from the slit.

By the above results, it was found that, when the pile density is more than about 20,000 piles/cm$^2$, good light-shielding can be achieved.

Incidentally, in the case of conventional raschel fabrics, the limit of the number of pile root is determined by the gauge. For example, when the maximum number in the cross direction is 24 roots/inch, that in the longitudinal direction is 65 roots/inch, and the number of the pile yarns per root is two, the number of the filament yarn is 3120 yarns/inch$^2$. When a common 24 filament yarn is used as the pile yarn, the pile density is about 11,600 piles/cm$^2$. Thus, it was made clear that the conventional light-shielding cloth does not have sufficient light-shielding ability.

The relation between the pile density and the light-shielding ability was further investigated, and the following conclusion was obtained.

When;

Dp: Pile density (piles/inch$^2$)
A: The number of stitches in the longitudinal direction immediately after knitting (yarns/inch)
B: The number of stitches in the lateral direction immediately after knitting (yarns/inch)
a: Shrinkage fraction in the longitudinal direction of the ground fabric
b: Shrinkage fraction in the lateral direction of the ground fabric $a$ or $b = (x-y)/x$ x: The length before shrinking in the longitudinal or lateral direction (the length immediately after knitting)
y: The length after shrinking in the longitudinal or lateral direction
n: The number of pile yarns per root (yarns/root)
f: The number of filaments composing the pile yarn (filaments/pile yarn) the pile density is;

$$Dp = \frac{A}{(1-a)} \cdot \frac{B}{(1-b)} \cdot n \cdot f$$

The pile density necessary for the light-shielding is more than 20,000 piles/cm$^2$, and therefore, this value is substituted, $$\frac{A}{(1-a)} \cdot \frac{B}{(1-b)} \cdot n \cdot f > 20,000 \cdot 6.45$$

(1 inch$^2$ = 6.45 cm$^2$)

is obtained. Therefore, a good light-shielding ability can be obtained in the range satisfying the above inequality.

Thus, a light-shielding cloth of the invention has a ground fabric and a pile portion knitted thereinto and satisfies the following formula:

$$\frac{A}{(1-a)} \cdot \frac{B}{(1-b)} \cdot n \cdot f > 129,000 \text{ piles/inch}^2$$

A: The number of stitches in the longitudinal direction immediately after knitting (yarns/inch)
B: The number of stitches in the lateral direction immediately after knitting (yarns/inch)
a: Shrinkage fraction in the longitudinal direction of the ground fabric
b: Shrinkage fraction in the lateral direction of the ground fabric $a$ or $b = (x-y)/x$ x: The length before shrinking in the longitudinal or lateral direction (the length immediately after knitting)

y: The length after shrinking in the longitudinal or lateral direction n: The number of pile yarns per root (yarns/root)

f: The number of filaments composing the pile yarn (filaments/pile yarn).

A film container of the invention is provided with the above light-shielding cloth as the light-shielding member on the slit for extending a photographic film.

As the means for satisfying the above inequality, there are the following methods.

(1) The pile root density of $$\frac{A}{(1-a)}, \frac{B}{(1-b)}$$

is increased. The pile root density can be increased by increasing the number of stitches A,B or increasing the shrinkage fraction a, b. However, since there is a limit for increasing the number of stitches, to increase the shrinkage fraction is effective. That is, a shrinkable yarn shrunk by heat or other energy is used as the chain yarn and the inlay yarn forming the ground fabric, and after knitting, the ground fabric is shrunk by adding the energy.

(2) The number f of filament yarns composing the pile is increased. That is, a multifilament having the number of filaments per pile of 40 to 100 is used as the pile yarn composing the pile.

(3) The number of pile yarns per root is increased.

(4) Combinations of the above (1) to (3).

When a light-shielding cloth of the invention is produced by shrinking the ground fabric, a knitted fabric containing pile yarn is formed. Then, the knitted fabric is shrunk in the longitudinal and lateral directions by an after-treatment of adding energy. Heat is used as the energy. In order to conduct appropriate heat treatment, it is necessary to select a heat-treating machine capable of shrinking the width of the ground fabric up to a prescribed width as well as shrinking in the longitudinal direction and capable of heat-setting so as to obtain a desired texture density and pile density of the ground fabric. As such a heat-treating machine, pin penter type heat setting machines are suitable. The temperature conditions for heat setting are set according to the properties of the fiber composing the ground fabric. For example, 160° to 190° C. is suitable for polyester fiber, and 150° to 180° C. is suitable for nylon fiber.

In the case of shrinking the ground fabric by heat or the like, the yarn composing the ground fabric can be selected from filament yarns having a shrinkability to a certain degree which does not damage the light-sensitive membrane on the surface of the film. However, when the pile density is increased by the shrinkage of the ground fabric alone, filament yarns having a shrinkage percentage in boiling water (JIS L-1073(1965) A method) of more than 15% are preferred. In the case of using a filament yarn having the shrinkage percentage of less than 15%, the shrinking of the ground fabric is insufficient, and the desired pile density cannot be obtained. As the filament yarn used for the ground fabric, those having a thickness of 30 to 150 denier is preferred, and the material may be synthetic fiber or chemical fiber.

The multifilament yarn can be produced by a one step method wherein the filaments are made with a fine denier in the raw yarn process, a two step method wherein the filaments are made with a fine denier after the raw yarn process, such as by dissolving or by splitting, or the like.

The knitting structure of the ground fabric may be any structure capable of forming set up piles on the surface of the ground fabric, and includes warp knitted structures) such as pole tricot and raschel fabric, and weft knitted structure, such as sinker pile.

The pile yarn for forming the pile portion may a conventional filament yarn, and a suitable thickness of the yarn is 50 to 150 denier.

The knitting machine for knitting the ground fabric does not have to be a high gauge knitting machine, but can be a standard gauge knitting machine.

The light-shielding cloth thus produced may be provided with a conventional after-treatment, such as dyeing, brushing and shearing, similar to conventional light-shielding cloths.

The relation between the conventional light-shielding cloth and the drawing resistance of the film was also investigated, and found that, in the case of the conventional light-shielding cloth having a knitted structure, since the pile yarn was disposed in parallel to the upper and lower chain yarns, the ground fabric was rendered thick. The slit width was usually fixed, and therefore, the thickness of the pile portion was rendered small. This caused an increase in the drawing resistance. Then, a further investigation was made, and it was found that the thickness of the ground fabric could be made thin by engaging the pile yarn with a sinker loop. Thus, a light-shielding cloth having a large ratio of the thickness of the pile portion could be obtained, and by using this light-shielding cloth, the drawing resistance could be reduced while with ensuring the light-shielding ability.

Thus, a light-shielding cloth of the invention has a ground fabric and a pile portion formed of pile yarn knitted thereinto, comprising setting up the pile yarn which passes between the needle loop and the sinker loop composing the ground fabric.

A film container of the invention is provided with the above light-shielding cloth as the light-shielding member on the slit for extending a photographic film.

In the above light-shielding cloth, it is sufficient that the pile yarn passes between the needle loop and the sinker loop and is set up, i.e. the pile yarn is knitted into only the sinker loop in a form of a loop. The number of the pile yarns passing the same part between the needle loop and the sinker loop may be one or plural yarns. The knitted structure may be various warp knitted structures or weft knitted structures as mentioned previously. In the case of the conventional warp knitted structure where the needle loop of the ground yarn is combined with the pile yarn, two or more needle loop portions of the ground fabric are necessary. However, in the case of the above knitted structure of the invention, the needle loop portion of the ground fabric portion may be one. Therefore, the size of the loop can be made small, and as a result, a high density knitted structure is possible which is impossible in the case of the conventional structure.

The fiber yarns composing the ground fabric portion and the pile portion may be made of various synthetic fibers, such as polyamide fibers, such as nylon fibers, polyester fibers, such as polyethylene terephthalate fibers, polyvinyl chloride fibers, polyacrylonitrile fibers, plyvinylidene chloride fibers, polyolefin fibers, such as polyethylene fibers and polypropylene fibers, and polyvinyl alcohol fibers, and natural or regenerated fibers, such as rayon fibers, cupra fibers, acetate fibers, cotton fibers, silk fibers and wool fibers, and various combinations of the above fibers. The fiber composing the ground fabric may be identical with or different from the fiber composing the pile portion.

The above light-shielding cloth is dyed in a light-shielding color usually black by any known method.

In the case of forming the pile portion by a combination of regular yarn and special yarn, the special yarn includes all yarns other than the regular yarn. Representative special yarns are described below.

(1) Conjugated yarns wherein two components different in shrinkage percentage are made into one filament.

(2) The yarns called high bulky yarn, including the high bulk yarns disclosed in Japanese Patent KOKAI No. 62-9837 and the yarns formed in loops by twisting a thermally shrunk filament with a unshrunk filament followed by shrinking treatment.

(3) Loop yarns which are spun yarns forming loops by winding a yarn in spiral on wadding, and setting by a twist setting yarn.

(4) Fancy yarns such as chain yarns set a thick soft spiral yarn in chain by two yarns.

(5) Knit-deknit yarns formed by once knitting the thermoplastic fiber for pile, heat-treating and unlacing to impart the fiber with crimp.

Since the piles composed of the above special yarn described in (1) and (5) are entangled with surrounding piles formed of regular yarn by the crimp and set up, each pile is resistant to falling down. Moreover, the piles are loosened to improve the light-shielding ability.

In the cases of the piles composed of the above special yarn described in (2), (3) and (40), when the piles are cut into a uniform thickness in the shearing process, each yarn is directed at random and loosened from the root. Therefore, the light-shielding ability is improved.

The entangled form and the entangling method are not restricted, and however, the following entangling methods are preferred.

(1) Sufficiently brushed, and then heat-set with brushing or immediately after brushing.

(2) In the dyeing process, thrown in the direction opposite to the liquid flow in a jet dyeing machine.

By entangling through the above method, the regular yarn is entangled with the special yarn, and set up. The entangled fabric has a small drawing resistance, and is excellent in light-shielding ability.

A preferable blend ratio of the regular yarn to the special yarn is 3:1 to 9:1 in view of the fiber drawing resistance and the light-shielding ability.

The fiber yarn composing the ground fabric and the pile portion can be selected from the aforementioned synthetic fibers, regenerated fibers, natural fibers and combinations thereof. Moreover, the fibers disclosed in Japanese Patent KOKAI Nos. 62-286042 and 2-15254 can also be selected. The fiber composing the ground fabric may be identical with or different from the fiber composing the pile portion.

The above light-shielding cloth is dyed in a light-shielding color usually black by any known method.

As to the arrangement of the piles, to arrange the piles dense in the knitting direction of the ground fabric is preferred, because the light-shielding ability is improved.

In order to prevent the contamination of photographic films from the dye used in the light-shielding cloth, after various investigations, it was found that, when the thermobleeding rate of the blue component is less than a particular value, i.e. 2.0%, the contamination can be prevented.

In this specification, the thermobleeding rate is determined as follows. A fabric woven using the same polyester fiber is dyed at 130° C. for 60 minutes, and then completely reduced with washing. This fabric is used as the standard fabric, and the dyed amount of the dye is measured by the solvent extraction from the standard fabric. Subsequently, the standard fabric is heat-treated at 160° C. for 3 minutes, and the amount of the dissolved dye by washing with acetone is measured. The above amount of the dissolved dye is used as the amount of thermobleeding dye. The thermobleeding rate is (the amount of thermobleeding dye)/(the dyed amount of the dye).

In general, black disperse dyes for dyeing black are composed of three components of a blue disperse dye, a red disperse dye and a yellow disperse dye, and the blending ratio of them is usually about 8:1:1.

As the blue disperse dye having a thermobleeding rate of less than 2.0%, there are C.I. Disperse Blue 120 having a thermobleeding rate of 1.6%, C.I. Disperse Blue 60 having a thermobleeding rate of 1.8% and the like.

As to the dye components other than the blue disperse dye having a thermobleeding rate of less than 2.0%, since the total amount is small compared with the amount of the blue disperse dye, the bleed amount by thermobleeding is very small. Therefore, usual disperse dyes can be used as the other dyes. The blend ratio of the blue component: the yellow component: the red component is preferably $60 \sim 100\% : 20 \sim 0\% : 20 \sim 0\%$, and $90 \sim 98\% : 0.1 \sim 5\% : 0.1 \sim 5\%$ is particularly preferred.

Suitable polyester fibers composing the light-shielding cloth include polyethylene terephthalate fibers, polybutylene terephthalate fibers, conjugate fibers of polyethylene terephthalate fiber and polybutylene cerephthalate fiber, and the like. The other fibers suitable for composing the light-shielding cloth include silk, cotton, viscose rayon, cupra rayon, nylon and acetate.

The light-shielding cloth is dyed black, and the color density value (L value) is preferably not more than 20 in order to ensure the light-shielding ability more completely.

The above disperse dye can be applied to various woven and knitted fabrics having piles, such as velvet woven fabrics, raised tricot fabrics, sinker pile knitted fabrics and double raschel fabrics. The form of the filament composing the light-shielding cloth is also not limited, and the filaments having various denier numbers and filament numbers, modified cross section yarns conjugated yarns, separated yarns, core shell yarns containing a disimilar component and Sea Island fibers are applicable. A suitable thickness of the yarn is 50 to 200 denier, and a suitable thickness of single yarn is 0.1 to 5 denier. A suitable number of filaments is 10 to 500 filaments.

Dyeing and finishing of the light-shielding cloth may be conventional.

In the case of the light-shielding cloth of which the entire or a part is formed of synthetic fiber treated at least with an antistatic agent or an antistatic treatment having a resistance to washing with warm water, suitable antistatic agents having a resistance to washing with warm water include hydrophilic polymer compounds having an ionic group or a polyoxyalkylene group including:

(1) Polyacrylate complex products containing quaternary ammonium.

(2) Condensation products of sulfoisophthalic acid and an alkylene glycol.

(3) Block copolymers of terephthalic acid or isophthalic acid and an alkylene glycol and a polyalkylene glycol.

(4) Copolymers of a polyalkylene glycol dimethacrylate or a polyalkylene glycol diacrylate and polyamide diacrylate.

The treatment of the light-shielding cloth with the antistatic agent is conducted so that the antistatic agent is fixed on the surface of the synthetic fiber. The treatment with the antistatic agent may be conducted at any process for manufacturing the light-shielding cloth, and the final process is preferred in order to obtain the greatest effect. As the treating method, there are two methods.

The shielding cloth is heat-treated at a high temperature to fix the antistatic agent onto the fiber surface of the light-shielding cloth. A suitable heat treatment temperature differs according to the kind of the antistatic agent and the like, and usually, about 150° to 190° C. is preferred. The excess antistatic agent not fixed is removed together with other contraries by washing. The washing is preferably conducted at 60° to 90° C. for 5 to 10 minutes. If the washing treatment is omitted, the excess amount of the antistatic agent extracted with warm water and other contraries remains on the surface of piles. In the case that such a light-shielding cloth is provided on the slit, the antistatic agent not fixed or other contraries are eluted by the water evaporated and condensed during standing in a closed container at 40° C. at 80% RH for a long period through the contact of the piles with the photographic film, and react with the photographic emulsion on the film to form traces, called adhesion marks after the development.

As the actual procedure of the submerged exhaustion, the light-shielding cloth is immersed rotating in a prepared solution of the antistatic agent, and heated at 80° to 140° C. for 10 to 70 minutes to fix the antistatic agent onto the fiber surface with exhaustion.

A suitable fixed amount of the antistatic agent is about 0.1 to 5% per the weight of the light-shielding cloth.

As the antistatic treatment having resistance to washing with warm water, there is a method of polymerizing a hydrophilic monomer directly to the polymer of polyester fiber by graft polymerization. Suitable hydrophilic monomers include acrylic acid, methacrylic acid, polyoxymethylene methacrylate ester and the like. The graft polymerization can be conducted using a prepared solution containing the hydrophilic monomer and a suitable catalyst by the following method:

(i) Immersing or spraying-steaming polymerization or low temperature plasma polymerization-washing (ii) Submerged exhaustion Actual procedure of the above methods conforms to the aforementioned procedures. Polymerization conditions are set so that the polymerization rate is maximum. A preferable polymerization degree is about 0.5 to 5% as the weight increase rate per the light-shielding cloth.

Suitable synthetic fibers include polyester fibers, such as polyethylene terephthalate fibers and various modified fibers thereof, polybutylene terephthalate fibers and various modified fibers thereof, blend fibers of them and conjugated fibers of them, polyamide fibers and polyacrylic fibers.

The light-shielding cloths of the invention are used as the light-shielding members provided on the slit of various film containers, the inner linings for light-shielding of devices directing photosensitive materials.

The film container has a structure capable of containing various films in a light-shielding state and extending the film from a slit, and preferable containers are those for containing various photographic photosensitive materials in a form of sheet or roll, such as color photograph printing papers, films and printing papers for computerized type-setting system, JIS 135 type photographic films, heat-sensitive papers, photosensitive resin films and microfilms.

As the method of attaching the light-shielding cloth to the film container, the light-shielding cloth is treated with filling, and a hot melt adhesive is coated. Then, the light-shielding cloth is cut into a prescribed size, and put on the position to adhere it. So, the light-shielding cloth is adhered by heat, ultrasonic wave, high frequency wave or the like. Other methods include using a filling adhesive having both roles of filler and adhesive, using a double face adhesive tape, and the like.

In the light-shielding cloth satisfying the aforementioned formula, the pile density is more than a prescribed value, and leak of light through the slit can be prevented completely.

In the light-shielding cloth wherein the pile yarn is passed between the needle loop and sinker loop of the ground fabric, the ground fabric can be made thin, and the thickness of the pile portion is made thicker. Therefore, the bounce impact force is small, and the film drawing resistance can be reduced with securing the light-shielding ability. The light-shielding cloth does not damage the film during extending and rewinding it.

In the case of the light-shielding cloth using a combination of regular yarn and special yarn, the pile portion where the special yarn is entangled with the regular yarn reduces the bounce impact elasticity with securing the light-shielding ability. Therefore, the film drawing resistance can be reduced, the light-shielding cloth does not damage the film during extending and rewinding it.

In the case of the light-shielding cloth using the special dye, the amount of the thermobleeding dye is small, and the film is not contaminated by the dye.

In the case of the light-shielding cloth treated with the antistatic agent or treatment, the durability of antistatic ability is improved to prevent the generation of static marks for a long period without affecting the photographic film adversely.

EXAMPLES

Example 1

Figure 2:
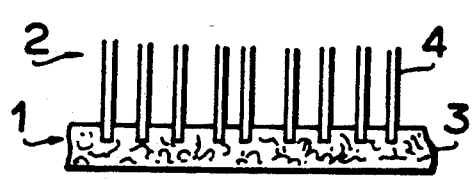
FIG. 2 is a partial sectional view thereof.

An example of the light-shielding cloth structure of the invention is illustrated in FIGS. 1 and 2. The light-shielding cloth was formed of a ground fabric 1 and a pile portion 2 knitted thereinto. The ground fabric 1 was formed in a knitted structure of filament yarn 3 for the ground fabric composed of chain yarn and inlay yarn, and the pile yarn 4 of the pile portion 2 was knitted into the filament yarn 3 of the ground fabric 1.

The raw yarn for the ground fabric 1 employed was a highly shrinkable filament yarn of 30 denier/18 filament polyester yarn having a shrinkage percentage in boiling water of 17%. The raw yarn for the pile portion 2 was a semidull filament yarn of 100 denier/48 filament polyester yarn. They were knitted by a 22 gauge double raschel machine, and cut the pile portion 2 by the center to obtain a pile knitted fabric with plush on one side having 22 vertical rows (wales) and 46 horizontal rows (courses).

Subsequently, the knitted fabric was heat-set by a pin tenter type heat setting machine. The machine conditions, such as the distance between pins and the delivery speed of the fabric, were set so that the knitted fabric can be shrunk freely in the longitudinal and lateral directions, and the heat set treatment was conducted at 190° C. for 20 seconds. Then, the fabric was treated by usual processing, such as dyeing and shearing, to obtain a double raschel fabric having a total thickness of 1.5 mm, a pile length of 1.2 mm, 30 wales and 52 courses. In FIG. 1, the distance between wales was 0.85 mm, and the distance between courses was 0.49 mm.

Comparative Example 1

Figure 11:
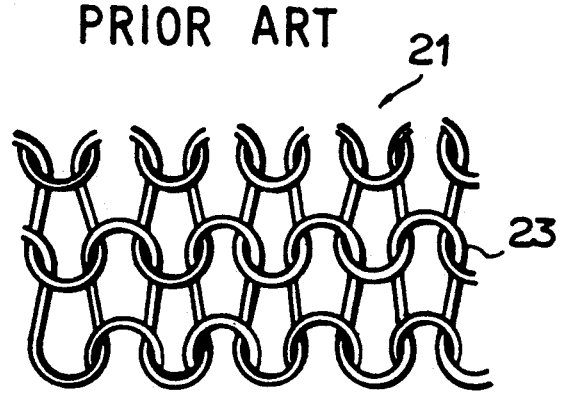
FIG. 11 is a partial rear view of a conventional light-shielding cloth.

The raw yarn for the base fabric 1 employed was a semidull filament yarn of 30 denier/18 filament polyester yarn having a shrinkage percentage in boiling water of 6%. The raw yarn for the pile portion 2 was a semidull filament yarn of 100 denier/48 filament polyester yarn. They were knitted and treated in the same manner as Example 1, and a double raschel fabric having a total thickness of 1.5 mm, a pile length of 1.2 mm, 24 wales and 44 courses was obtained. In FIG. 11, the distance between wales was 1.05 mm, and the distance between courses was 0.58 mm.

Evaluation of Light-Shielding Ability

The light-shielding cloths obtained in Example 1 and Comparative Example 1 were adhered to the slit of a container for a 35 mm photographic film by the conventional method, and each light-shielding ability was evaluated. The results are shown in Table 1.

TABLE 1

| | Texture Density | Pile Density | Light-Shielding Ability |
|---|---|---|---|
| Example 1 | 52 courses/30 wales | 46,400 pile yarn/cm$^2$ | A |
| Comparative 1 | 44 courses/24 wales | 31,400 pile yarn/cm$^2$ | B |

A: Fogged portion is shorter than 5 cm from the slot.
B: Fogged portion is 5–10 cm from the slot.
C: Fogged portion is longer than 10 cm from the slot.

Examples 2–5 and Comparative Example 2

The light-shielding cloth of Example 2 was formed of a heat shrinkable filament as the chain yarn and the inlay yarn and a general yarn as the pile yarn.

The light-shielding cloth of Example 3 was formed of a general yarn as the chain yarn and the inlay yarn and a multifilament yarn as the pile yarn.

The light-shielding cloth of Example 4 was formed of a heat shrinkable filament as the chain yarn and the inlay yarn and a multifilament yarn as the pile yarn.

The light-shielding cloth of Example 5 was formed of the same yarn as Example 2, and the number of piles per root was increased.

Details of Examples 2–5 and Comparative Example 2 are shown in Table 2.

TABLE 2

| | Example 2 | Example 3 | Example 4 | Example 5 | Comparative Example 2 |
|---|---|---|---|---|---|
| Pile Yarn | 50 d/24 f Polyester | 50 d/48 f Polyester | 50 d/36 f Polyester | 50 d/24 f Polyester | 50 d/24 f Polyester |
| Chain Yarn | 75 d/24 f Shrinkable Polyester | 75 d/24 f Polyester | 75 d/24 f Shrinkable Polyester | 75 d/24 f Shrinkable Polyester | 75 d/24 f Shrinkable Polyester |
| Inlay Yarn | 75 d/24 f Shrinkable Polyester | 75 d/24 f Polyester | 75 d/24 f Shrinkable Polyester | 75 d/24 f Shrinkable Polyester | 75 d/24 f Shrinkable Polyester |
| Knitting Machine | Raschel Machine | Raschel Machine | Raschel Machine | Raschel Machine | Raschel Machine |
| Gauge Number | 22 | 22 | 22 | 22 | 22 |
| Ground Density at Knitting | 22 wales/inch 60 courses/inch | 22 wales/inch 60 courses/inch | 22 wales/inch 60 courses/inch | 22 wales/inch 60 courses/inch | 22 wales/inch 60 courses/inch |
| Ground Density after Drying | 33 wales/inch 83 courss/inch | 24 wales/inch 65 courses/inch | 33 wales/inch 83 courses/inch | 24 wales/inch 65 courses/inch | 24 wales/inch 65 courses/inch |
| Pile Number/Root | 2 | 2 | 2 | 4 | 2 |
| Pile Density | 20383 piles/cm$^2$ | 23218 piles/cm$^2$ | 30574 piles/cm$^2$ | 23218 piles/cm$^2$ | 11609 piles/cm$^2$ |
| Dye | Black Disperse Dye 8% owf | Black Disperse Dye 8% owf | Black Disperse Dye 8% owf | Black Disperse Dye 8% owf | Black Disperse Dye 8% owf |

Evaluation of Light-Shielding Ability

JIS 315 type photographic film cartridges were prepared using the light-shielding cloths obtained in Examples 2–5 and Comparative Example 2 which were adhered to the slit, ad a roll of a ISO 100 photographic color negative film (manufactured by Fuji Photo Film Co., Ltd.) was loaded in each cartridge. The slit width in the transverse direction was 2.1 mm. Each cartridge was exposed to the light of 70,000 luxes for 3 minutes to the slit and both ends of the cartridge. The film was then developed, and fogging degree was evaluated. The results are shown in Table 3.

TABLE 3

| | Light-Shielding Ability |
|---|---|
| Example 2 | B |
| Example 3 | B |
| Example 4 | A |
| Example 5 | B |
| Comparative 2 | C |

Example 6

Figure 3:
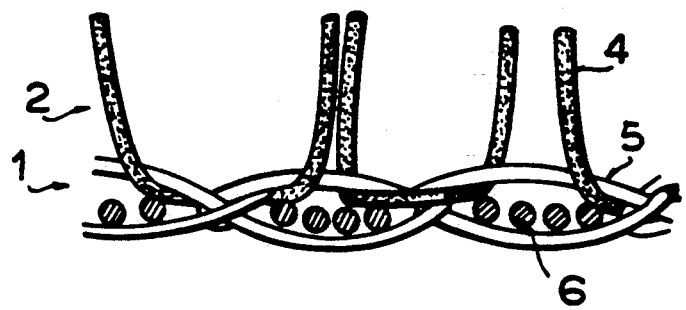
FIG. 3 is a partial sectional view taken on line A—A of FIG. 4.
Figure 4:
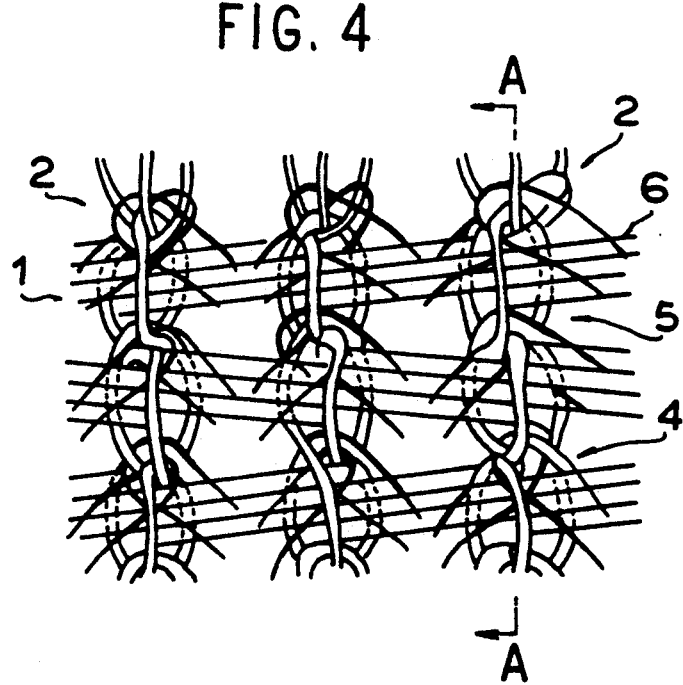
FIG. 4 is a partial plan view of another light-shielding cloth embodying the invention.

An example of the light-shielding cloth structure of the invention is illustrated in FIGS. 3 and 4. The light-shielding cloth was formed of a ground fabric 1 and a pile portion 2 knitted thereinto. The ground fabric 1 was formed in a warp knitted structure composed of chain yearn 5 corresponding to the warp of knitted fabric and inlay yarn 6 combining chain yarns 5 corresponding to the weft of knitted fabric. The pile yarn 4 forming the pile portion 2 passed between the chain yarn 5 on the side of the pile portion 2 and the inlay yarn 6 to be formed in a loop, and it was projected from the ground fabric upward and set up. That is, the pile yarn 4 was fixed by the chain yarn 5.

The pile yarn employed was 50 denier polyester yarn, and the chain yarn and the inlay yarn were 75 denier polyester yarn. A light-shielding cloth having a warp knitted structure shown in FIGS. 3 and 4 was prepared using a double raschel machine, and adhered to the slit of a JIS 135 type photographic film cartridge as the light-shielding member.

Various properties of the light-shielding cloth are as follows:
  Total thickness: 1.7 mm
  Ground fabric thickness: 0.3 mm
  Pile density: 24,000 piles/cm$^2$ A roll of a ISO 400 photographic film was loaded in the cartridge. The cartridge was exposed to the light of 100,000 luxes for 10 minutes, and had a sufficient light-shielding ability. The drawing resistance was small, i.e. 120 g, and the surface of the photographic film was not damaged. The photographic film could not be delivered smoothly in a camera. Moreover, the adhesion of fallen yarn and pile yarn dust to the photographic emulsion surface was rare.

Conventional Example 1

The pile yarn, the chain yarn and the inlay yarn were the same polyester yarns as Example 6. A light-shielding cloth having a knitted structure shown in FIG. 12 was prepared using a double raschel machine, and adhered to the slit of a JIS 135 type photographic film cartridge as the light-shielding member.

Various properties of the light-shielding cloth are as follows:
  Total thickness: 1.7 mm
  Ground fabric thickness: 0.5 mm
  Pile density: 24,000 piles/cm$^2$ The same photographic film as Example 6 was loaded in the cartridge, and the cartridge was exposed to the light of 100,000 luxes for 10 minutes. Although the cartridge had a sufficient light-shielding ability, the drawing resistance was more than twice that of Example 6, i.e. 250 g and the surface of the photographic film was occasionally damaged. Sometimes, the photographic film could not be delivered in a camera.

The results are summarized in Table 4.

TABLE 4

Figure 12:
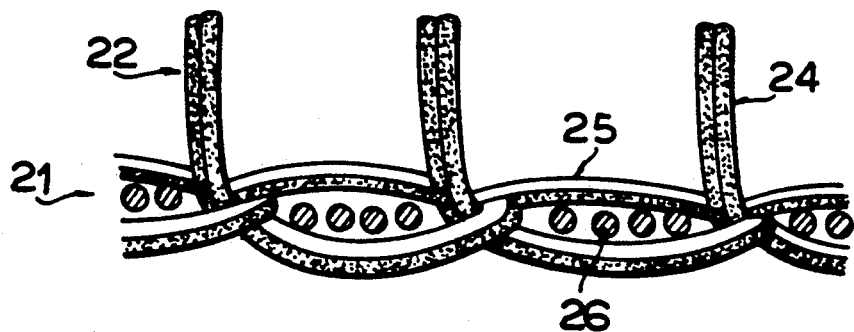
FIG. 12 is a partial sectional view of a conventional light-shielding cloth.
Figure 13:
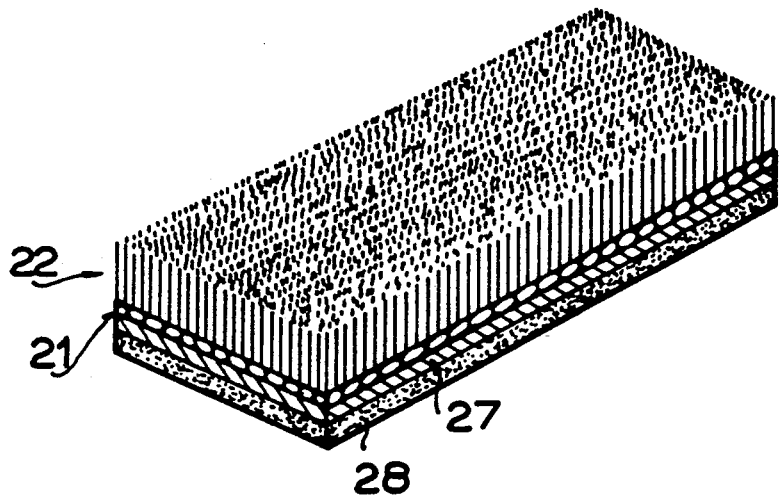
FIG. 13 is a perspective view of a conventional light-shielding cloth.
Figure 14:
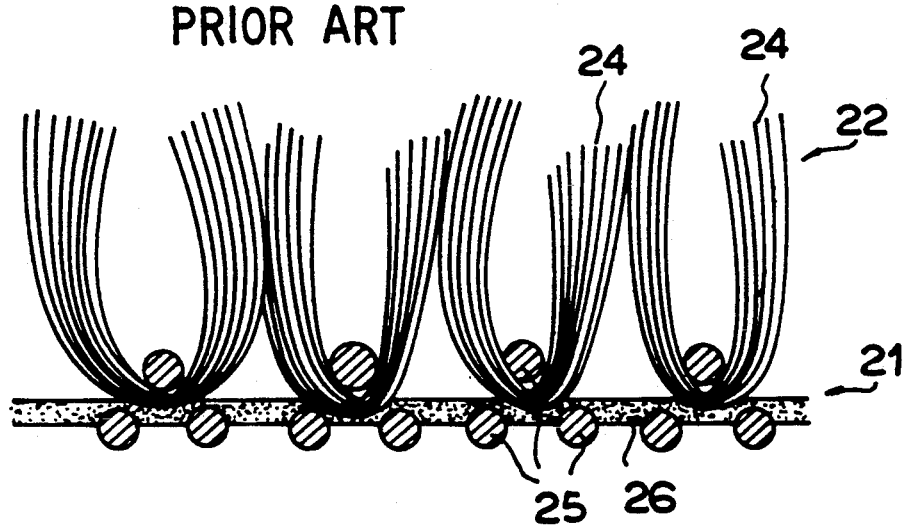
FIG. 14 is a partial sectional view thereof.

|  | Example 6 | Conventional Example 1 |
|---|---|---|
| Pile Yarn | 100 d/36 f Polyester | " |
| Chain Yarn | 75 d/24 f Polyester | " |
| Insert Yarn | 75 d/24 f Polyester | " |
| Knitting Machine | Double Raschel Machine | " |
| Teremp Cloth structure | FIGS. 3–4 | FIG. 12* |
| Ground Fabric Thickness | 0.3 mm | 0.5 mm |
| Total Thickness | 1.7 mm | 1.7 mm |
| Pile Density | 24,000 piles/cm$^2$ | 24,000 piles/cm$^2$ |
| Drawing Resistance | 120 g | 250 g |
| Abrasion of Film Surface | None | Occasionally slight abrasion |

*The pile yarn was passed together with the chain yarn.

Drawing Resistance: The photographic film loaded in each cartridge was rolled up, and the spool was fixed by a tape so as no to be loosened. The cartridge was allowed to stand at 50° C at 30% RH for 24 hours, and then allowed to stand at 20° C. at 65% RH for 2 hours. The tape was detached. After no occurrence of loosening was confirmed, the resistance at the time of drawing the film out of the slit was measured by an Instron tensile tester. The slit width in the transverse direction was 2.0 mm.

Total Thickness: Measured by using a thickness gauge with a load of 10 g/cm$^2$.

Examples 7–11 and Comparative Examples 3–6

Figure 5:
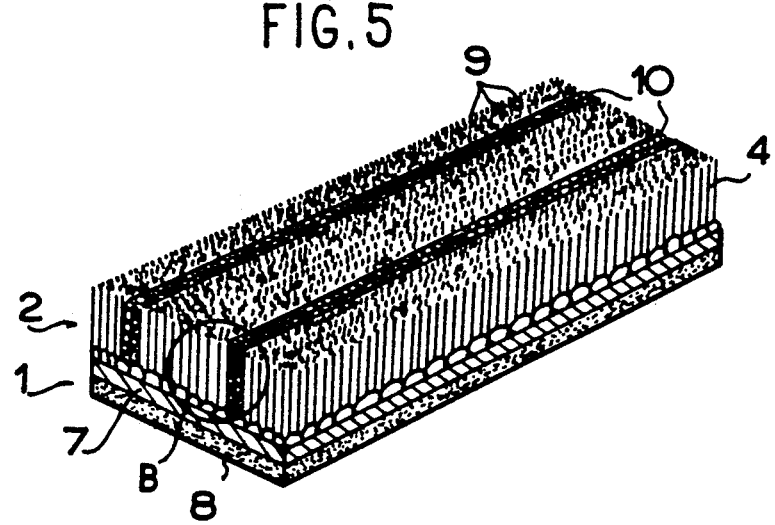
FIG. 5 is a perspective view of another light-shielding cloth embodying the invention.
Figure 6:
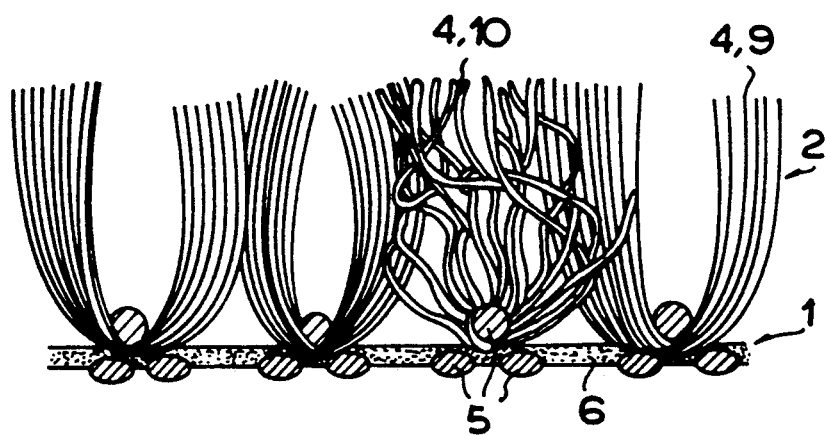
FIG. 6 is an enlarged section of the encircled portion B in FIG. 5.
Figure 7:
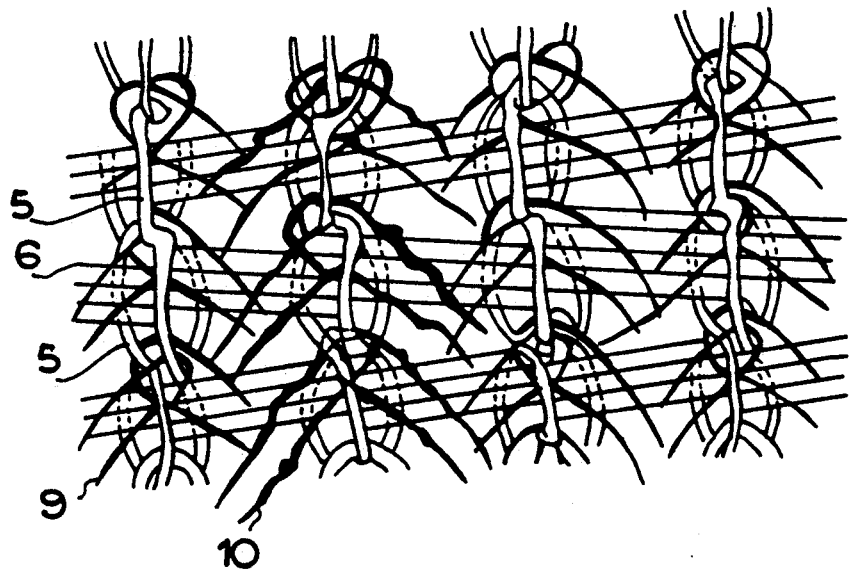
FIG. 7 is a partial plan view thereof.

An example of the light-shielding cloth structure of the invention is illustrated in FIGS. 5 to 7. The light-shielding cloth was formed of a ground fabric 1 and a pile portion 2 knitted thereinto. A filler layer 7 was provided under the ground fabric 1 for preventing the adhesive of an adhesive layer 8 from permeating the pile portion 2 as well as for preventing the yarns of the pile portion 2 from falling out of the ground fabric 1. The adhesive layer 8 was provided under the filler layer 7 for adhering the light-shielding cloth to the slit of the film container. The ground fabric 1 was, as shown in FIGS. 6 and 7, composed of chain yarn 5 corresponding to the warp of knitted fabric and inlay yarn 6 combining chain yarns 5 corresponding to the weft of knitted fabric. The pile yarn 4 was knitted with the chain yarn 5 and set up to form the pile portion 2, and regular yarn 9 and special yarn 10 were used as the pile yarn 4. The row of the regular yarn 9 was provided in parallel to the row of the special yarn 10 in the knitting direction, and the ratio of the regular yarn 9 to the special yarn 10 was about 3:1. The special yarn 10 was entangled with adjacent regular yarn 9.

Figure 8:
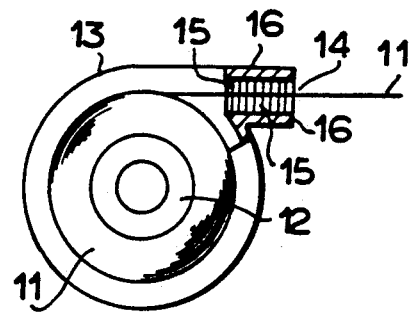
FIG. 8 is a sectional view of a photographic film cartridge using an embodiment of the light-shielding cloth of the invention.
Figure 9:
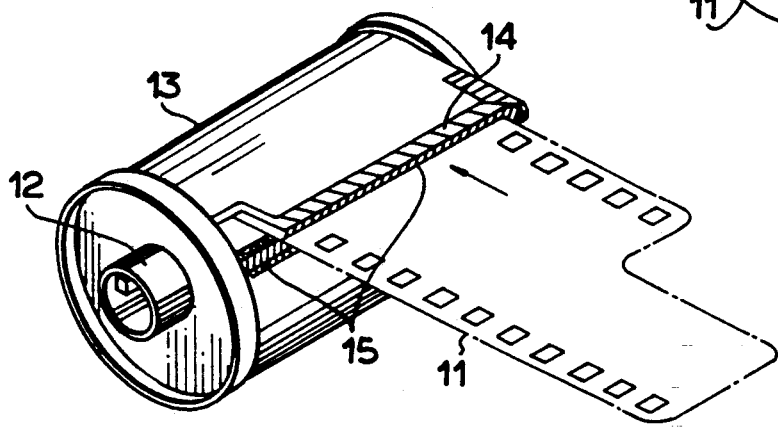
FIG. 9 is a perspective view partially cutaway thereof.

A JIS 135 type photographic film cartridge is shown in FIGS. 8 and 9. A roll of a photographic film 11 was wound around a spool 12, and loaded in the container body 13. A slit 14 was formed in parallel to the axial direction, and light-shielding cloth 15 was adhered to both sides of the tongue portions 16,16 of the slit 14 as the light-shielding member.

The light-shielding cloths of Examples 7–11 and Comparative Examples 3–6 were prepared by a double raschel knitting machine using the pile yarns, the chain yarns and the inlay yarns shown in Table 5. Each light-shielding cloth was cut and attached to the JIS 135 type photographic film cartridge.

Various properties of the light-shielding cloth are as follows:
  Total thickness: 1.7 mm
  Pile density: 38,000 piles/cm$^2$
  Slit width: 2.0 mm A roll of a ISO 400 photographic film was loaded in each cartridge, and the drawing resistance and the light-shielding ability were measured in the same manner as the evaluation of Example 6. The developing agent used was "CN-16" manufactured by Fuji Photo Film Co., Ltd., and the light-shielding ability was indicated as the round number of fogged part of the roll film evaluated by visual inspection.

TABLE 5

|  | Example | | | | | Comparative | | | |
|---|---|---|---|---|---|---|---|---|---|
|  | 7 | 8 | 9 | 10 | 11 | 3 | 4 | 5 | 6 |
| Pile Yarn |  |  |  |  |  |  |  |  |  |
| Regular yarn*[1] | 50 d/36 f | " | " | " | " | " | " | None | 50 d/36 f |
| Special yarn*[2] | 75 d/24 f | " | " | " | 75 d/24 f*[5] | 75 d/24 f | " | " | None |
| R/S*[3] | 3/1 | 5/1 | 7/1 | 9/1 | 5/1 | 1/1 | 11/1 | 0/1 | 1/0 |
| Chain Yarn | 75 d/24 f | " | " | " | " | " | " | " | " |
| Inlay Yarn | 75 d/24 f | " | " | " | " | " | " | " | " |

TABLE 5-continued

| | Example | | | | | Comparative | | | |
|---|---|---|---|---|---|---|---|---|---|
| | 7 | 8 | 9 | 10 | 11 | 3 | 4 | 5 | 6 |
| Knitting Machine | D. Raschel*4 | " | " | " | " | " | " | " | " |
| Drawing Resistance (g) | 180 | 120 | 110 | 100 | 110 | 300 | 100 | 410 | 95 |
| Fogged Part (Round Number) | 0 | 0 | 1 | 1 | 0 | 1 | 3 | 1 | 4 |

*1Polyester yarn
*2Conjugate yarn except of Example 11
*3Yarn number ratio of regular yarn/special yarn
*4Double raschel machine
*5Denier/Filament As shown in Table 5, in the cases of the light-shielding cloths of Examples 7-11, the drawing resistance was all less than 200 g, and the round number of the fogged part was 0 or 1. Thus, by using the light-shielding cloth of the invention, inexpensive photographic film cartridges having a small drawing resistance and being excellent in the light-shielding ability could be obtained.

On the other hand, in the cases of that of Comparative Examples 3 and 5, although the round number of the fogged part was one, the drawing resistance was 300 g or 410 g. As a result, the photographic film could not be delivered, and abrasion occurred on the film surface. In the cases of that of Comparative Examples 4 and 6, the light-shielding ability was insufficient, and the round number of the fogged part was 3 or 4.

Figure 10:
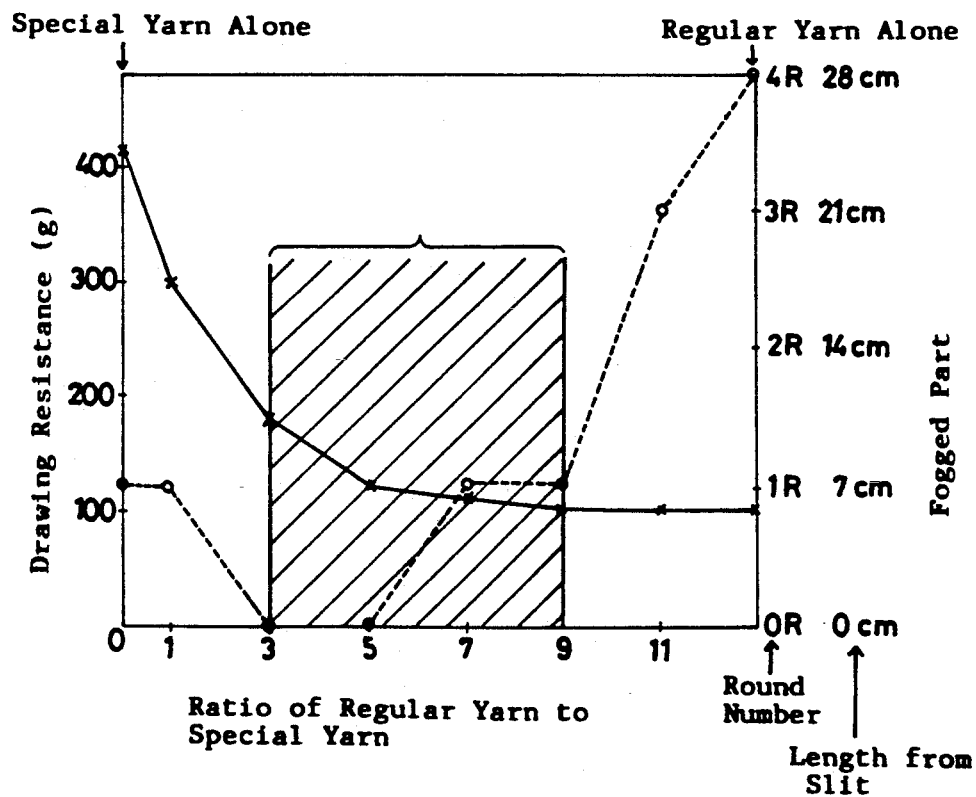
FIG. 10 is a graph indicating the relation between the ratio of the pile amount of regular yarn to special yarn and drawing resistance or fogged length of photographic film.

The above results were graphed in FIG. 10. In the figure, the abscissa indicates the ratio of the pile amount of the regular yarn to the pile amount of the special yarn, and the ordinate indicates the drawing resistance and the fogged length. The full line indicates the graph of the drawing resistance, and the broken line indicates the length of the fogged part. The oblique lined A part indicates a practically possible range wherein the drawing resistance was not more than 180 g and the fogged part was not more than 1 round. In this range, it does not occur that the photographic film cannot be delivered in a camera or that the photographic film is damaged. As shown in FIG. 10, the light-shielding cloths of Examples 7-11 are within the above practical range, whereas the light-shielding cloths of Comparative Examples 3-6 are out of the range.

Example 12

A light-shielding cloth composed of polyester fiber was immersed in a treating solution containing 10 g/l of 15% aqueous suspension of terephthalic acid/ethylene glycol/polyethylene glycol copolymer and 0.1 g/l of anionic dispersing agent, and treated at 120° C. for 30 minutes. The light-shielding cloth added with the above antistatic agent was adhered to the slit of a JIS 135 type photographic film cartridge in the conventional manner, and a roll of a ISO 400 photographic film was loaded in the cartridge. The cartridge was allowed to stand at 80° C. for 20 hours, and the film was developed in the conventional method. The abnormality in the light sensitivity of the film portion contacted with the light-shielding cloth was observed.

Example 13

A light-shielding cloth composed of polyester fiber was impregnated with an aqueous suspension composed of 4.0% methacrylic acid/0.1% redox catalyst/2.0% fiber swelling agent uniformly in an amount of 70% by weight of the light-shielding cloth, and a steaming polymerization was conducted at 100° C. for 10 minutes. Then, the light-shielding cloth was washed at 80° C. for 10 minutes. The light-shielding cloth treated with the antistatic finish was incorporated into a photographic film cartridge similar to Example 12, and exposed to a high temperature similar to Example 12. Then, the abnormality in the light sensitivity of the film portion contacted with the light-shielding cloth was observed.

Comparative Example 7

A light-shielding cloth composed of polyester fiber was impregnated with an aqueous solution of 1.0% quaternary ammonium cationic surfactant being a common antistatic agent, and dried at 100° C. for 3 minutes. Then, the light-shielding cloth was heat-treated at 150° C. for 3 minutes. The light-shielding cloth added with the antistatic agent was incorporated into a photographic film cartridge similar to Example 12, and exposed to a high temperature under similar conditions. Then, the abnormality in the light sensitivity of the film portion contacted with the light-shielding cloth was observed.

The results of the above evaluation tests are summarized in Table 6.

TABLE 6

| | Fixation Durability Percentage* | Observation Results |
|---|---|---|
| Example 12 | 80% | Nothing Abnormal |
| Example 13 | 95% | Nothing Abnormal |
| Comparative 7 | 25% | Adhered Marks |

*The fixation durability percentage is the rate of the residual antistatic agent after washing the light-shielding cloth in a hot water at 60° C. for 10 minutes per the amount of the antistatic agent before washing.

Example 14

A double raschel fabric pretreated with conventional treatments, such as degumming and heat treatment, was dyed with a disperse dye of C.I Disperse Orange 30-0.3% C.I Disperse Red 167-0.1% and C.I. Disperse Blue 120 (bleeding rate of 1.6%)-8.0% owf using 0.4 g/l of a dispersing agent of "Sunsoft RM-340" (manufactured by Nikka Kagaku K.K.) in a bath ratio of 1:30 at 130° C. for 60 minutes, followed by washing and then drying. The dyed fabric was treated with conventional treatments, such as brushing and spearing, to obtain a light-shielding cloth colored black having a color density value (L value) of 18.3 and a high pile density on the surface. The light-shielding cloth thus obtained was adhered to the slit of a JIS 135 type photographic film cartridge in the conventional manner, and a roll of a ISO 400 photographic film was loaded in the cartridge. The cartridge was allowed to stand at 80° C. for 20 hours, and the film was developed in the conventional method. The contamination of the film portion contacted with the light-shielding cloth was observed. A part of the cartridge samples was divided, and the contamination of the film portion contacted with the light-shielding cloth was observed prior to the development.

Another part of the cartridge samples was exposed to the light of 100,000 luxes for 10 minutes, and the light-shielding ability (fogged degree) was evaluated after the development.

Example 15

Using C.I. Disperse Orange 30-0.3%, C.I. Disperse Red 167-0.1% and C.I. Disperse Blue 60 (bleeding rate of 1.8-10.0% owf, a light-shielding cloth colored black having a color density value (L value) of 19.0 and a high pile density on the surface was obtained in a method similar to Example 14.

As to the above light-shielding cloth, the film contamination and the light-shielding ability were measured by the same method as Example 14.

Comparative Example 8

Using C.I. Disperse Orange 30-0.3%, C.I. Disperse Red 167-0.1% and C.I. Disperse Blue 139 (bleeding rate of 3.8-6.0% owf, a light-shielding cloth colored black having a color density value (L value) of 16.0 and a high pile density on the surface was obtained in a method similar to Example 14.

As to the above light-shielding cloth, the film contamination and the light-shielding ability were measured by the same method as Example 14.

Comparative Example 9

Using C.I. Disperse Orange 30-0.3%, C.I. Disperse Red 167-0.1% and C.I. Disperse Blue 60 (bleeding rate of 1.6-3.0% owf, a light-shielding cloth colored gray having a color density value (L value) of 31.0 and a high pile density on the surface was obtained in a method similar to Example 14.

As to the above light-shielding cloth, the film contamination and the light-shielding ability were measured by the same method as Example 14.

The results of the above evaluation tests are summarized in Table 7.

TABLE 7

| | Color Density Value | Light-Shielding Ability | Contamination |
|---|---|---|---|
| Example 14 | 18.3 | A | C |
| Example 15 | 19.0 | A | C |
| Comparative 8 | 16.0 | A | D |
| Comparative 9 | 31.0 | B | C |

Color Density Value: The value obtained by the spectrophotometry according to the color difference formula based on the Lab system of JIS Z-8730.
Light-Shielding Ability: A: Fogged portion is shorter than 10 cm from the slit. B: Fogged portion is not shorter than 10 cm from the slit.
Contamination: C: Entirely normal D: There was traces or image separation.

In the case of Examples 14 and 15, the thermobleeding rate of the blue component of the disperse dye was less than 2.0, and the color density value (L value) was less than 20. The light-shielding ability as well as the contamination were very good. Whereas, in the case of Comparative Example 8, the thermobleeding rate of the blue component was beyond 2.0, and contamination traces were observed in the samples irrespective of before or after the development. In the case of Comparative Example 9, the color density value (L value) was beyond 20, and the light-shielding ability was insufficient.

We claim:

1. A light-shielding cloth having a ground fabric and a pile portion formed of pile yarns and satisfying the following formula:

$$\frac{A}{(1-a)} \cdot \frac{B}{(1-b)} \cdot n \cdot f > 129{,}000 \text{ piles/inch}^2$$

where
- A: The number of stitches in the longitudinal direction immediately after knitting (yarns/inch)
- B: The number of stitches in the lateral direction immediately after knitting (yarns/inch)
- a: Shrinkage fraction in the longitudinal direction of the ground fabric
- b: Shrinkage fraction in the lateral direction of the ground fabric $$a \text{ or } b = (x - y)/x$$

- x: The length before shrinking in the longitudinal or lateral direction (the length immediately after knitting)
- y: The length after shrinking in the longitudinal or lateral direction (the length immediately after knitting)
- n: The number of pile yarns per root (yarns/root)
- f: The number of filaments composing the pile yarn (filaments/pile yarn)

said ground fabric being composed of needle loops and sinker loops and wherein said pile yarn comprises a combination of regular yarn and special yarn which entangle with each other, said special yarn including at least one yarn selected from the group consisting of conjugated yarn, high bulk yarn, loop yarn, fancy yarn and knit-deknit yarn and wherein a plurality of pile yarns pass between the needle loop and the sinker loop.

2. The light-shielding cloth of claim 1 wherein said ground fabric is composed of chain yarn and inlay yarn and said plurality of pile yarn pass between the chain yarn and inlay yarn from both lateral sides of the chain yarn opposite to each other at the same loop.

3. The light-shielding cloth of claim 2 wherein the ground fabric is warp knitted raschel fabric.

4. The light-shielding cloth of claim 1 which comprises polyester yarn that is dyed black with a black disperse dye composed of a blue component, a red component and a yellow component, wherein the thermobleeding rate of the blue component is less than 2.0%.

5. The light-shielding cloth of claim 4 of which the color density L value is not more than 20.

6. The light-shielding cloth of claim 1 which comprise synthetic fiber treated with at least an antistatic agent or an antistatic treatment having a resistance to washing with warm water.

7. The light-shielding cloth of claim 6 wherein said resistance to washing with warm water is to keep a fixation durability rate of more than 80% after washing at 60° C. for 10 minutes.

8. The light-shielding cloth of claim 6 wherein said antistatic agent is a hydrophilic polymer compound having an ionic group of a polyoxyalkylene group.

9. The light-shielding cloth of claim 6 wherein said synthetic fiber is polyester fiber.

10. The light-shielding cloth of claim 9 wherein said antistatic treatment is by directly polymerizing a hydrophilic monomer to the polymer of the polyester fiber by graft polymerization.

11. A film container having a slit which is provided with the light-shielding cloth of claim 1 as the light-shielding member on the slit for extending a photographic film.

* * * * *